July 4, 1950  E. MARTIN ET AL  2,513,660
PROPELLER PITCH CONTROL MEANS
Filed Oct. 22, 1946  2 Sheets-Sheet 1
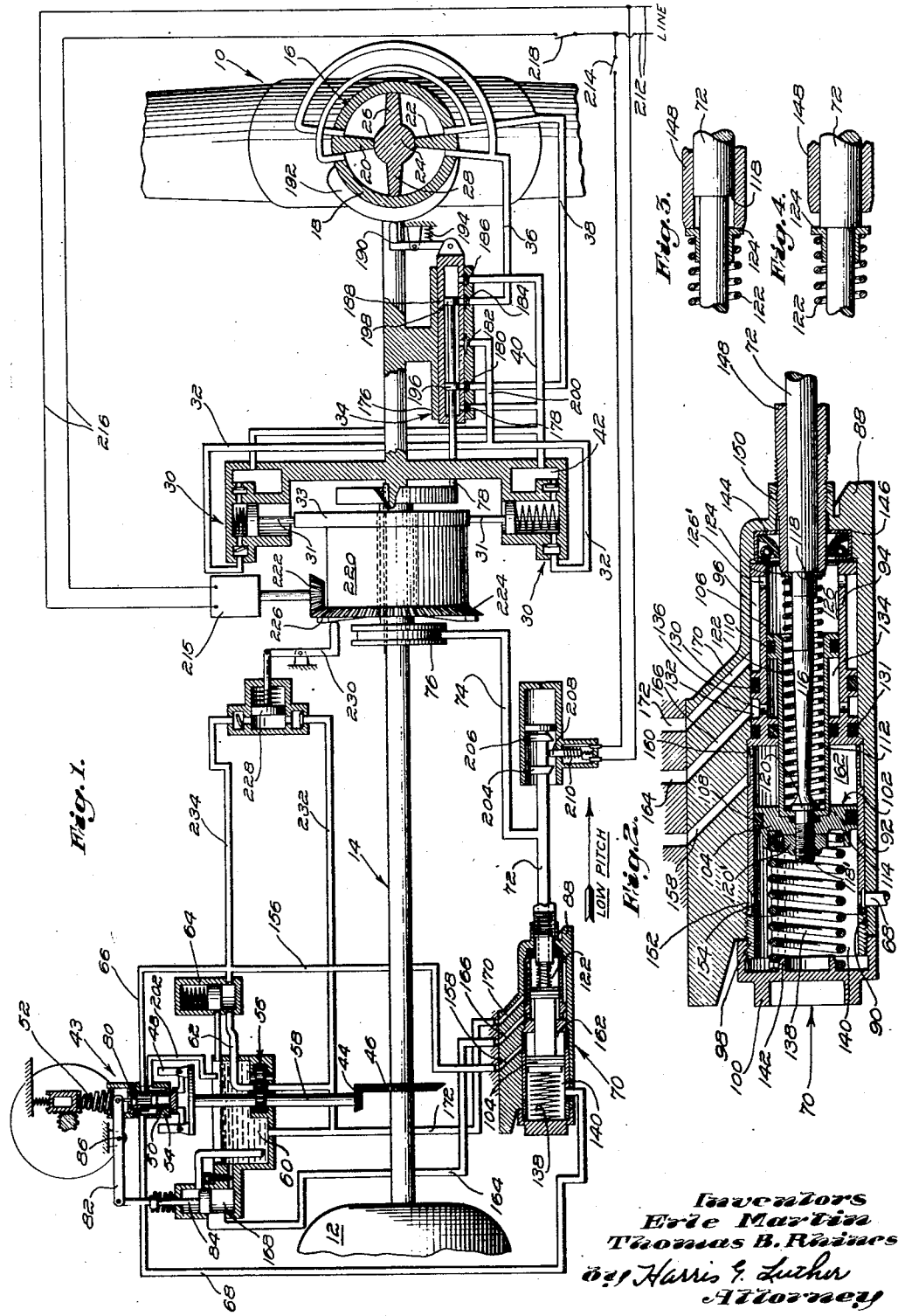
Inventors
Erie Martin
Thomas B. Raines
By Harris G. Luther
Attorney

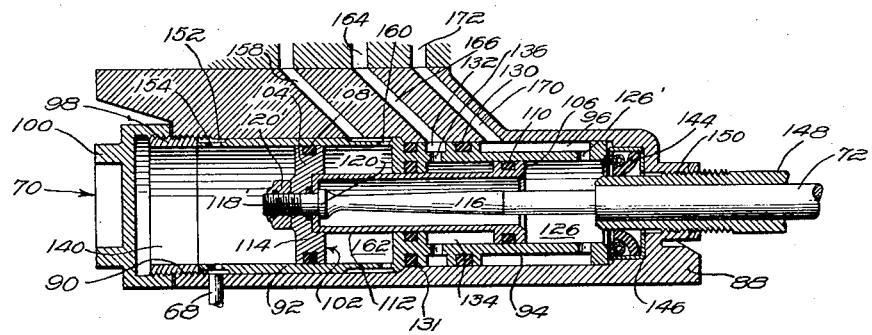

Patented July 4, 1950

2,513,660

UNITED STATES PATENT OFFICE 2,513,660

PROPELLER PITCH CONTROL MEANS

Erle Martin, West Hartford, and Thomas B. Rhines, Glastonbury, Conn., assignors to United Aircraft Corporation, East Hartford, Conn., a corporation of Delaware Application October 22, 1946, Serial No. 704,856

8 Claims. (Cl. 170—160.2)

This invention relates to controllable pitch propellers of the type in which hydraulic pressure from a governor is used to control a servo-motor connected to a hydraulic pitch changing motor control; and is particularly concerned with an improved servo-motor mechanism for such a propeller.

Prior to this invention governor pressure was used to move the servo-motor toward low pitch position against the action of a spring and the spring was used to move the servo-motor toward high pitch position. With this arrangement, when the motor is shut down and governor pressure drops to zero, the spring forces the servo-motor toward high pitch position. When the engine turns over for starting and hydraulic pressure is again available to operate the pitch changing motor, the propeller blades will move toward high pitch into a position corresponding to the position of the servo-motor. This provides a greater load on the starter and is especially objectionable for starters of the shotgun type since, if the engine does not catch on the first attempt, each successive attempt moves the blades to a higher angle until the starter does not possess sufficient power to turn over the engine fast enough for starting.

It is a further disadvantage of this form of construction that in an unfeathering operation it is necessary to pump cold, low-viscosity oil by means of an extremely low capacity, piston-type auxiliary pump to move the servo-motor toward low pitch position against the contrary action of the spring.

It is an object of this invention to provide an improved servo-motor mechanism in which the piston is operated hydraulically in both directions by fluid pressure effective when the propeller is rotating, thus eliminating the above mentioned disadvantages due to the movement of the piston toward high pitch by a spring.

A further object of the invention is the provision of an improved servo-motor mechanism in which the piston assumes a predetermined intermediate position when the governor pressure drops to zero.

Another object of the invention is to provide a servo-motor mechanism in which the movable element is spring biased out of its extreme positions into an intermediate range of operation in which it is freely floating.

Another object of the invention is the provision of a servo-motor having means which will assist in an unfeathering operation by automatically returning the servo-motor to an intermediate position whenever engine rotation has ceased.

A still further object of the invention is to provide a differential servo-motor mechanism which is spring biased to an intermediate position wherein constant governor pump pressure acts on the smaller piston area to urge the servo-motor toward high pitch position and governor pump pressure as controlled by the governor acts on the larger area of the piston to urge the servo-motor toward low pitch position.

A further object of the invention is generally to improve the construction and operation of controllable pitch propellers.

These and other objects and advantages of the invention will be apparent from the following detailed description of one form of the invention which is shown in the accompanying drawings for purposes of illustration.

In these drawings:

Fig. 1 is a diagrammatic view of the propeller pitch control means of a hydraulically actuated, constant speed, feathering and reversing propeller having the improved servo-motor mechanism;

Fig. 2 is an enlarged sectional view of the improved servo-motor mechanism;

Figs. 3 and 4 are details on an enlarged scale of part of the servo-motor in different positions of operation;

Fig. 5 is a view similar to Fig. 2 showing a modified construction for the servo-motor and Fig. 6 is a similar view showing another modification of the servo-motor.

Referring to the drawings in detail and particularly to Fig. 1, the numeral 10 generally indicates a hydro-controllable, feathering type propeller and the numeral 12 generally indicates the propeller driving engine from which the propeller drive shaft generally indicated at 14 projects. The propeller 10 is provided with suitable pitch changing apparatus and is shown herein as having an individual vane-type hydraulic motor for each blade, one of such motors being shown diagrammatically in section in Fig. 1 and generally indicated at 16. This motor has an outer movable portion 18 connected to the corresponding propeller blade and provided with two diametrically opposed vanes 20 and 22 and an inner fixed member 24 provided with two diametrically opposed vanes 26 and 28. Fluid is supplied to the pitch changing motors of the several blades from a suitable pressure source, such as the pump generally indicated at 30, rotatable with engine shaft 14 and having piston plungers 31 reciprocated by a normally relatively fixed cam 33.

From pump 30 fluid is conducted through the pressure conduits 32 leading to the distributing valve selectively to the conduits 36 and 38, depending upon the setting of the valve as positioned by the governor to determine the direction of propeller pitch change. When hydraulic fluid under pressure is supplied through one of the lines 36 or 38 to one side of the pitch changing motors, fluid will drain from the opposite side of the motors through the other line to valve 34 from which it will be conducted through the conduit 40 to the sump, or reservoir, 42 connected with the intake side of pump 30. The pump 30 and the sump 42 are located in the propeller hub and the pump plungers 31 are reciprocated during rotation of the propeller by rotation of the plungers 31 around stationary cam 33.

The fluid distributing valve 34 is also located in the propeller hub and rotates therewith. This valve is controlled by a speed responsive governor generally indicated at 43 driven from the engine 12 by a suitable gear drive including a gear 44 on the governor drive shaft and a gear 46 concentric with and rotatable with shaft 14, as shown in Fig. 1. The governor 43 includes a set of centrifugally actuated fly balls 48 which act to move a slide valve 50 in opposition to a speeder spring 52. The slide valve 50 reciprocates in a fixed valve cylinder 54 and the side walls of the slide valve and valve cylinder are provided with registering ports in a usual manner which control the flow of fluid through the governor. A fluid pump 56, shown herein as of the gear type, is driven from the governor drive shaft 58 and supplies pressure fluid from the reservoir 60 through conduits 62, constant pressure valve 64 and conduit 66 to the governor which, when its ports are aligned, admits high pressure fluid to conduit 68, leading to a servo-motor generally indicated at 70. The servo-motor operates a piston rod 72 connected through the displacement mechanism 74 and rotational slip joint 76 with the plunger 78 of the pitch controlling, fluid distributing valve 34 so that the latter valve will be positioned to change the pitch of the propeller in response to the demands by the governor for increase or decrease of the speed in the engine 12 and its connected propeller 10.

Within the governor slide valve 50 there is a reciprocable pilot valve 80 projecting out of the upper end of the slide valve and pivotally connected to one end of a lever member 82 which is pivotally connected at its opposite end to the upper end of a compensating plunger 84 and supported intermediate its length on a fixed pivot 86. At its lower end the pilot valve 80 carries a piston which controls the fluid flow through the governor ports to prevent over-travel of the governor in a well known manner.

The servo-motor 70 as shown more clearly in Fig. 2 comprises an outer cylinder 88 having an open left-hand end provided with internal threads 90. The cylinder 88 is provided with a cylindrical liner having a left-hand portion 92 which engages the side walls of cylinder 88 and a right-hand portion 94 which is spaced from the walls of cylinder 88 to provide an annular chamber 96 of smaller diameter. The liner is held in position in cylinder 88 by means of a threaded sleeve 98 which protrudes beyond the end of cylinder 88 to receive the threaded cylinder head 100 which forms a closure for the left-hand open end of cylinder 88. A differential piston structure generally indicated at 102 has a large diameter piston 104 located in the left-hand end of cylinder 88 within the cylindrical liner portion 92 and a smaller diameter piston 106 located in the liner portion 94, these pistons having suitable ring packings 108 and 110 respectively.

The smaller diameter piston 106 comprises an annular ring having an elongated annular sleeve 112 which is seated at its left-hand end in an annular recess 114 in the right-hand side of piston 104. Piston rod 72 has a reduced end portion 116 forming an annular shoulder 118, and has a flange 120 adjacent its free end beyond which it terminates in a threaded end portion 118' which extends through the end wall of sleeve 112 and through piston 104 and is engaged by a spring centering nut 120'. A compression spring 122 is disposed about the reduced end portion 116 of the piston rod, abutting the bottom wall of sleeve 112 at one end and abutting the flange of the flanged sleeve 124 at its other end which, in the position of the parts shown in Fig. 2, rests against abutment 118. The liner for cylinder 88 has a series of holes 126' leading from chamber 96 to the chamber 126 at the right-hand side of piston 106. The sleeve portion 94 of the liner is provided with two sets of external annular grooves housing packings 130 and 131 which engage the walls of cylinder 88 and form an annular chamber 132 therebetween which communicates with the annular chamber 134 on the left-hand side of piston 106 through a series of holes 136. A compression spring 138 is disposed in the chamber 140 at the left-hand side of larger piston 104 and has its right-hand end abutting the piston 104 and its left-hand end abutting the cylinder head 100 which has a suitable spring locating flange 142 axially aligned with the spring centering means of nut 120'.

Where piston rod 72 enters cylinder 88 a suitable packing box 144 is provided having a packing 146 therein which engages the outer surface of a sleeve 148 closely surrounding piston rod 72 and through which the latter is reciprocable. Sleeve 148 is axially adjustable in cylinder 88 by suitable means such as the threaded connection 150 to cylinder 88. It will be noted that by adjustment of this sleeve the axial location of the annular flange of sleeve 124 and consequently the tension of spring 122 can be varied.

Conduit 68 communicates with chamber 140 on the left-hand side of larger piston 104 through an annular passage 152 formed between the liner and cylinder 88 and through holes 154 in the liner to supply governor controlled pump pressure to the left-hand face of piston 104. Governor pump pressure is also provided through conduit 156 and communicating passage 158 in cylinder 88 to holes 160 which communicate with chamber 162 on the right-hand side of piston 104. A conduit 164 communicates through a passage 166, chamber 132 and holes 136 with chamber 134, thus connecting the left-hand side of the smaller piston 106 with chamber 168 beneath the piston plunger 84 of the compensator. Chamber 126 on the right-hand side of smaller diameter piston 106 is connected through holes 126', chamber 96, passage 170 and conduit 172 with the governor sump 60.

Valve 34 for distributing fluid to the vane motor has an outer cylindrical valve casing 176 provided with ports 178, 180, 182, 184 and 186. Within the outer casing 176 is disposed a reciprocable sleeve 188 connected at one of its ends with a propeller pitch changing mechanism by suitable mechanical connections schematically shown in Fig. 1 as a bell crank lever 190 and a cam 192, the bell crank lever being maintained in contact with the cam by a suitable compression spring 194. The valve plunger 78 extends into the sleeve 188 and is provided therein with spaced valve pistons 196 and 198 which control ports provided in the valve sleeve 188 and registerable respectively with ports 178, 180, 182, 184 and 186 in the outer valve casing 176 over the entire range of relative movement between the sleeve and the casing. The port 180 is connected by conduit 38 to one side of the hydraulic motor 16. The port 184 is connected by conduit 36 with the opposite side of the hydraulic motor, and the port 182, located at the mid length position of the distributor valve, is connected by conduits 200 and 32 with the outlet of the pump 30 so that fluid under pressure is applied at all times when the propeller is rotating to this intermediately positioned port.

The operation of the distributing valve 34 is such that when the plunger 78 is moved by the servo-motor in response to governor demands for a speed change, one side of the hydraulic motor 16 will be connected with the fluid under pressure entering from conduit 200 while the other side of the motor 16 will be connected with the sump 42 through conduit 40, resulting in the rotation of the motor 16 to change the propeller pitch. As the propeller pitch is changed, however, the sleeve 188 will be moved to close off the connections between the distributing valve and the propeller pitch changing motor 16 at a rate such that when the propeller pitch has been changed a number of degrees sufficient to correct the governor indicated deviation from the speed for which the governor is set, the pitch changing motor will be stopped and hydraulically locked against any further pitch change until the governor 43 again causes the position of plunger 78 to be changed. Thus the position of the plunger 78 always indicates the pitch angle of the propeller blades.

The operation of the improved differential servo-motor which moves the plunger 78 in response to demands of the governor 43 will next be explained. Assuming that the engine speed decreases below the value for which the governor is set, the governor fly balls 48 will move inwardly permitting the sleeve 50 to move downwardly and align the governor ports to admit fluid from the governor pump 56 through conduits 62, 66 and 68 to chamber 140 at the left-hand face of the larger diameter piston 104. The right-hand face of piston 104 is also acted on by governor pump pressure admitted through conduit 156, passage 158 and holes 160 but this pressure, although it is the same governor pump pressure that is acting on the left-hand face of piston 104, acts on a smaller area of the piston due to the presence of the axial sleeve 112. Accordingly the differential piston will be moved to the right in a direction to move the plunger 78 in the low pitch direction, the fluid in chamber 126 during this movement being vented through holes 126', chamber 96, passage 170 and conduit 172 to reservoir 60. During this movement of piston rod 72 toward low pitch position from the position of the parts in Fig. 2 the spring 122 is being compressed. As the pitch of the propeller blades decreases the engine will increase its speed and under the action of the compensating mechanism described in connection with the pitch changing motor the blades will be moved only as much as is necessary to bring the motor up to the set speed. Following movement of piston rod 72 toward low pitch position spring 122 is under compression (Fig. 3).

Similarly if the engine speed becomes too high the governor fly balls will move outwardly to raise sleeve 50 and connect conduit 68 to vent through the governor ports and conduit 202 to reservoir 60, the governor pump pressure then communicating through conduit 156, passage 158 and holes 160 with the chamber 162 and acting on the right-hand face of piston 104 will move piston rod 72 and the propeller distributor valve plunger 78 toward their high pitch positions. During this movement spring 138 is compressed by piston 104 while the stress in spring 122 remains unchanged in all positions to the left of the Fig. 2 position as will be seen from Figs. 2 and 4.

It will thus be evident that when the propeller stops rotating and the governor pump pressure falls to zero the pistons of the servo-motor will move under the action of one or the other of springs 138, 122 into a mid-position in which the propeller blades occupy a compromise position between high and low pitch. This position can be predetermined by suitable adjustment of abutment sleeve 148 of the servo-motor.

An extension of piston rod 72 carries two axially spaced pitch limit stops 204 and 206 which engage a movable abutment 208 and limit the movement of piston rod 72 in both directions to a normal intermediate range of angular adjustment of the propeller blades. A solenoid 210 is provided for withdrawing abutment 208 to permit piston rod 72 to move beyond stop 204 into reverse pitch and similarly permitting the piston to move beyond stop 206 into the feathered position of the blades. Solenoid 210 is energized from a suitable source of power 212, a switch 214 being provided in line 212 for operation by the pilot in a usual manner.

The power source 212 also energizes a motor 215 through conductors 216 under the control of a pilot operated switch 218. The rotation of motor 215 drives the normally stationary drum 220 which carries cam 33, suitable gears 222 and 224 being provided for effecting rotation of the drum. Drum 220 carries a cam 226 which reciprocates a piston 228 of a hydraulic pump through a pivoted lever 230 to supply fluid under pressure from reservoir 60 and conduit 232 through conduits 234, 66 governor 43 and conduit 68 to the servo-motor for the blade unfeathering operation, when the servo-motor without springs is used (Fig. 5), it being understood that when the motor 215 drives the pump piston 228 the cam 33 also operates the pumps 30 to supply hydraulic pressure to pitch changing motor 34.

This unfeathering mechanism is more fully described and claimed in a co-pending application Serial No. 679,379, filed June 26, 1946, and assigned to the assignee of this application.

In the modified form of servo-motor shown in Fig. 5 the springs 138 and 122 are omitted. In the operation of this modified form the servo-motor will be freely floating and hence tend to move toward low pitch position when it is attempted to start the motor since the governor controlled pressure from the pump 56 will act on the left-hand face of piston 104, thus enabling the motor to start without interference from the propeller.

In the modified form of servo-motor shown in Fig. 6, a short spring 236 is provided having its left-hand end anchored to cylinder head 100 and having its free end engageable with piston 104 just before the servo-motor reaches its extreme left-hand position corresponding to the feathered position of the blades. In operation spring 236 moves the servo-motor piston out of feathered position following stopping of the propeller in its feathered position, so that it is possible to start the engine again without necessitating the use of the output of auxiliary pump 228 to move the piston out of feathered position. The spring 122 operates in the same manner as described in connection with the servo-motor in Fig. 2.

As a result of this invention it will be evident that a servo-motor mechanism has been provided which automatically returns to an intermediate position corresponding to an intermediate pitch angle whenever the engine propeller combination is not rotating. It will also be evident that by the provision of the differential servo-motor above described it has been made possible to provide a pitch changing propeller mechanism in which starting of the engine is greatly facilitated and in which unfeathering of the propeller is greatly aided.

As a result of this invention it will also be noted that in the event of a hydraulic failure of the control system in flight the propeller blades will automatically assume a predetermined intermediate pitch angle suitable for emergency operation.

It will also be evident that a particularly reliable servo-motor mechanism has been provided which is simple in construction and free from trouble in operation.

While we have shown and described three forms which the invention may assume in practice, it will be understood that various changes may be made in the construction and operation of the parts without departing from the scope of the following claims.

What is considered new and is desired to be covered by Letters Patent is:

1. In combination with a propeller having controllable pitch blades, means, including a servo-motor, for controlling the pitch of said blades, said servo-motor including a freely floating movable member having opposed piston surfaces of different areas, means effective when the propeller is rotating for selectively supplying fluid under a single pressure to one or simultaneously to both of said surfaces for moving said member in opposite directions to increase or decrease the pitch of said propeller blades, said means for supplying fluid including means for continuously supplying fluid under constant pressure to the piston surface of smaller area and a speed governor controlling the supply of pressure fluid acting on the piston surface of larger area.

2. In combination with a propeller having controllable pitch blades, means, including a differential servo-motor, for controlling the pitch of said blades, said servo-motor having a movable member with a predetermined effective area and opposed smaller effective area, said movable member having one definite position corresponding to a definite intermediate pitch angle of the blades, a source of fluid under pressure, means, including a constant speed governor, for selectively connecting said pressure source to act on said predetermined area, means for connecting said pressure source to act continuously on said smaller area, and spring means for constantly biasing the movable member of said servo-motor into a position corresponding to said intermediate pitch angle of said blades.

3. In combination with a propeller having controllable pitch blades, a fluid operated pitch changing motor, means, including a differential servo-motor, for controlling the admission of fluid to said pitch changing motor, said servo-motor having differential effective areas, said servo-motor having one definite position corresponding to a definite intermediate pitch angle of the blades, a source of fluid under pressure, means for connecting said pressure source to act constantly on the smaller of said areas to bias said servo-motor toward high pitch position, means including an engine speed governor for connecting said pressure source as modified by said governor to act on the larger of said areas to bias said servo-motor in the opposite direction, and spring means for biasing said servo-motor into a normal position corresponding to said predetermined intermediate pitch angle of said blades.

4. In combination with a propeller having controllable pitch blades, a fluid operated pitch changing motor, means, including a differential servo-motor, for controlling the admission of fluid to said pitch changing motor, said servo-motor having differential effective areas, said servo-motor having one definite position corresponding to a definite intermediate pitch angle of the blades, a source of fluid under pressure, means for connecting said pressure source to act on the smaller of said areas to bias said servo-motor in one direction, means including a governor for connecting said pressure source as controlled by said governor to act on the larger of said areas to bias said servo-motor in the opposite direction, spring means for biasing said servo-motor into a normal intermediate position corresponding to said intermediate pitch position of said blades, and means for varying the tension of said spring means to vary said normal position of said servo-motor.

5. In combination with a propeller having controllable pitch blades, a fluid operated pitch changing motor, means, including a differential servo-motor, for controlling the admission of fluid to said pitch changing motor, said servo-motor including a differential area piston, a source of fluid under pressure, means for connecting said pressure source to act constantly on the smaller area side of said piston to bias said servo-motor in one direction, means including a governor for connecting said pressure source as controlled by said governor to act on the larger area side of said piston to bias said servo-motor in the opposite direction, a spring urging said servo-motor constantly in said opposite direction, a second spring urging said servo-motor in said one direction only when said member is moved by said pressure fluid beyond a predetermined position.

6. In combination with a propeller having controllable pitch blades, a fluid operated pitch changing motor, means, including a differential servo-motor, for controlling the admission of fluid to said pitch changing motor, said servo-motor including a movable member having exposed areas on opposite sides of different effective areas, a source of fluid under pressure, means for connecting said pressure source to act constantly on the smaller of said areas to bias said servo-motor in one direction, means including a governor for connecting said pressure source as controlled by said governor to act on the larger of said areas to bias said servo-motor in the opposite direction, a spring acting on said movable member throughout its entire extent of movement for continually urging said member in said opposite direction, a second spring acting on said movable member throughout only a portion of its extent of movement to urge said member in said one direction, and means for varying the length of said portion.

7. In combination with a propeller having controllable pitch blades, a fluid operated pitch changing motor, means, including a differential servo-motor, for controlling the admission of fluid to said pitch changing motor, said servo-motor including a movable member having opposed exposed areas of different effective areas, a source of fluid under pressure, means for connecting said pressure source to act constantly on the smaller of said areas to bias said movable member in a blade pitch increasing direction, means including a governor for connecting a pressure source as controlled by said governor to act on the larger of said areas to bias said movable member in a blade pitch decreasing direction, a spring acting on said movable member in a direction to assist said governor controlled pressure, and a second spring acting on said movable member in a direction to assist said constantly acting fluid pressure in a predetermined portion of the range of movement of said movable member.

8. In combination with a propeller having controllable pitch blades, a fluid operated blade changing motor, a distributing valve having a follow-up connection with said motor controlling the admission of fluid to said motor, a servo-motor controlling said distributing valve, said servo-motor including a hydraulically movable member having opposed differential piston surfaces, means effective when the propeller is rotating for supplying fluid under a single pressure to the smaller one, or simultaneously to both, of said surfaces to move said movable member in opposite directions to increase or decrease the pitch of said blades, said means including means for continuously supplying fluid under constant pressure to one of said piston surfaces and a speed governor controlling the supply of pressure fluid acting on the other of said piston surfaces.

ERLE MARTIN.
THOMAS B. RHINES.

REFERENCES CITED

The following references are of record in the file of this patent:

UNITED STATES PATENTS

| Number | Name | Date |
|---|---|---|
| 1,512,804 | Roucka | Oct. 21, 1924 |
| 1,893,612 | Caldwell | Jan. 10, 1933 |
| 2,163,663 | Caldwell | June 27, 1939 |
| 2,204,639 | Woodward | June 18, 1940 |
| 2,310,261 | Schwarzhaupt et al. | Feb. 9, 1943 |
| 2,391,323 | Martin | Dec. 18, 1945 |
| 2,413,439 | Drake | Dec. 31, 1946 |
| 2,422,966 | Hoover | June 24, 1947 |
| 2,424,559 | Drake | July 29, 1947 |
| 2,468,635 | Maystead | Apr. 26, 1949 |

FOREIGN PATENTS

| Number | Country | Date |
|---|---|---|
| 517,696 | Great Britain | Feb. 6, 1940 |
| 537,079 | Great Britain | June 9, 1941 |
| 560,522 | Great Britain | Apr. 6, 1944 |